US005759975A

United States Patent [19]

Maxwell

[11] Patent Number: 5,759,975
[45] Date of Patent: Jun. 2, 1998

[54] PAINT LINE CLEANER

[75] Inventor: Jeffrey W. Maxwell, White Lake, Mich.

[73] Assignee: Gage Products Company, Ferndale, Mich.

[21] Appl. No.: 703,052

[22] Filed: Aug. 26, 1996

Related U.S. Application Data

[60] Provisional application No. 60/016,307 May 8, 1996.

[51] Int. Cl.$^6$ ............... C11D 7/26; C11D 7/24; C11D 7/60; B08B 3/08

[52] U.S. Cl. .......... 510/203; 510/202; 510/206; 510/211; 510/213; 510/201; 510/405; 510/188; 134/22.1; 134/22.14

[58] Field of Search ............... 510/202, 203, 510/206, 211, 213, 201, 405, 188; 134/22.1, 22.14

[56] References Cited

U.S. PATENT DOCUMENTS

| | | | |
|---|---|---|---|
| 4,269,724 | 5/1981 | Hodson | 252/171 |
| 4,469,525 | 9/1984 | Dodge | 134/3 |
| 4,812,255 | 3/1989 | Suwala | 252/142 |
| 4,988,395 | 1/1991 | Taguchi et al. | 148/24 |
| 5,015,410 | 5/1991 | Sullivan | 252/166 |
| 5,035,829 | 7/1991 | Suwala | 252/170 |
| 5,106,525 | 4/1992 | Sullivan | 252/162 |
| 5,221,362 | 6/1993 | Porta et al. | 134/40 |
| 5,454,985 | 10/1995 | Harbin | 252/558 |
| 5,658,869 | 8/1997 | Singer | 510/272 |

FOREIGN PATENT DOCUMENTS 19533994  3/1997  Germany.

*Primary Examiner*—Douglas J. McGinty
*Attorney, Agent, or Firm*—Gifford, Krass, Groh, Sprinkle, Patmore, Anderson & Citkowski, P.C.

[57] ABSTRACT

A cleaning composition for paint delivery systems includes 3–90% of an organic solvent which may comprise one or more aromatic hydrocarbons, aliphatic hydrocarbons and aliphatic esters. The composition also includes between 0.5 and 30% of a hydroxy carboxylic acid such as glycolic acid, as well as a coupling agent which may comprise one or more alcohols, glycols or glycol ethers.

18 Claims, No Drawings

PAINT LINE CLEANER

RELATED APPLICATION

This patent application claims priority of provisional patent application Ser. No. 60/016,307 entitled "Paint Line Cleaner" filed May 8, 1996.

Field of the Invention

This invention relates generally to methods and compositions for cleaning, and in particular to methods and compositions for cleaning paint deposits from the interior of tubes, tanks, conduits and the like. Most specifically the present invention relates to a cleaning composition which includes a hydroxy carboxylic acid and is capable of dissolving a wide variety of paint formulations.

Background of the Invention

Paint delivery systems utilized for the finishing of a wide variety of manufactured items such as motor vehicles, household appliances and the like are becoming increasingly more sophisticated. A typical industrial paint delivery system may comprise a central paint supply having a number of painting stations communicating therewith. Such systems can selectably deliver a variety of different paints to a given painting station and include complex fluid pathways having a number of tanks, pumps and conduits. These paint delivery systems tend to accumulate deposits in the course of their use, and such deposits can decrease, and even block, the flow of paint therethrough. The deposits are comprised of pigment, resins and other components of the paint. In addition to causing clogging, such deposits can also contaminate the paint color, and can break loose and cause surface defects in the finished, painted product. Accordingly, it is necessary to periodically clean the paint delivery system.

Because of the complexity of such systems, and because of the necessity of avoiding expensive down time, it is generally preferable that the systems be cleaned without disassembly. Typically, systems are cleaned by passing a variety of solvents, detergents or other such materials therethrough. Prior art processes usually involve numerous steps and multiple cleaning compositions; and such processes frequently do not provide full removal of deposits, particularly hardened pigment residues.

A typical prior art process can involve flushing five or more different cleaning compounds of varying polarity through the paint system and can include up to thirty separate operational steps. The numerous cleaning compounds and steps are needed in order to fully remove all deposits from the system and to insure compatibility of any traces of cleaning compounds remaining in the system with subsequently introduced paint. As a result, the system must be sequentially rinsed with various materials in a predetermined order.

In addition, a manufacturing operation will typically employ a variety of different paint formulations comprised of various resins, pigments, solvents and the like. Therefore, typical residues encountered in paint lines may comprise a mixture of materials. Also, different paint systems in a particular manufacturing facility may be contaminated with a variety of different paint residues. In view of the foregoing, it will be appreciated that there is a need for a paint line cleaning composition which is capable of removing paint line residues in a single cleaning step. In addition, the cleaning composition should also be capable of removing a wide variety of residues from paint delivery systems. In addition, the composition should not be corrosive or otherwise harmful to the paint delivery systems, and should be low in toxicity, and preferably is low in cost.

The present invention provides a cleaning composition having particular utility for cleaning paint lines. The composition readily removes a variety of paint residues and is safe for equipment and personnel and low in cost. The composition of the present invention, as will be explained in greater detail hereinbelow, includes a hydroxy carboxylic acid as an active ingredient thereof. While it has been found that a number of other organic acids may effectively remove certain paint deposits, hydroxy carboxylic acids, in particular glycolic acid and lactic acid have been found to have very broad utility against a variety of paint deposits.

While glycolic acid has been used in the prior art in certain paint stripper formulations, its broad utility has never been recognized, and the material was generally present as a secondary ingredient in such compositions. For example, U.S. Pat. No. 5,454,985 discloses a paint stripping composition which may optionally include an acidic accelerator material, with glycolic acid being one possible accelerator. Similarly, U.S. Pat. No. 5,106,525 discloses a water soluble paint stripper which includes gamma butyrolactone together with an organic acid, of which glycolic acid is a listed, but nonpreferred material. Similar disclosure is found in U.S. Pat. Nos. 5,035,829 and 4,812,255 both of which disclose water dispersable strippers for cleaning uncured paint. The strippers include a particular solvent mixture comprising glycol ether and a five membered lactone or lactam such as N-methyl pyrrolidone together with an organic acid. Formic and acetic acids are listed as being preferred, and glycolic acid is listed in a group of secondarily preferred materials. U.S. Pat. No. 4,269,724 discloses a methylene chloride based paint stripper which further includes an amine salt of glycolic acid.

The present invention is directed to a particular formulation which is comprised of a specific group of organic solvents, a coupling agent and a hydroxy carboxylic acid. The composition safely and effectively cleans a wide variety of paint residues from the interior lines of a paint delivery system. The composition is low in cost, easy to use and readily disposed of, because of its low toxicity. These and other advantages of the present invention will be readily apparent from the discussion, description and examples which follow.

Brief Description of the Invention

There is disclosed herein a composition for cleaning paint lines. The composition comprises, on a weight basis, 20–90% of a particular organic solvent which is selected from the group consisting of aromatic hydrocarbons, aliphatic hydrocarbons, aliphatic esters, aliphatic ketones and combinations thereof. The composition further includes 5–30% of a coupler which is selected from the group consisting of: aliphatic alcohols, glycols, glycol ethers and combinations thereof. The composition also includes 0.5–30% of a hydroxy carboxylic acid such as glycolic acid or lactic acid. The composition may also include some water associated with the acid, generally in an amount up to 30% of the amount of acid present. The composition can also include ancillary ingredients such as thickeners, oxidizers, surfactants, vapor suppressants, corrosion inhibitors, colorants, buffers and the like.

In one embodiment of the invention, the composition includes 40–90% of the organic solvent. In yet another embodiment, the composition includes 60–80% of the organic solvent. In another embodiment the coupler is present in an amount of 10–15%, and in yet another embodiment the acid is glycolic acid and is present in an amount of 2–25%.

In some specific embodiments, the organic solvent may include aromatic naphtha, and an aliphatic ester of a C1–C8 alcohol and a C1–C8 acid. In specific embodiments, the coupler may comprise a C1–C5 alcohol. In some very specific embodiments, the organic solvent comprises a mixture of light aromatic naphtha and N-butyl acetate while the coupler comprises isopropyl alcohol.

Detailed Description of the Invention

The present invention concerns a cleaning composition in which an organic solvent is at least partially coupled to a hydroxy carboxylic acid (which is most preferably an alpha hydroxy acid such as glycolic acid or lactic acid). The compositions of the present invention effectively utilize the broad spectrum cleaning ability of the acids and benefit from their low toxicity, absence of objectionable odor and low cost, to provide a novel cleaning composition having significant commercial utility. In the broadest sense, the compositions of the present invention include an organic solvent, a coupler and the acid, and may optionally include ancillary ingredients as is known in the art. Each of these categories of materials will be discussed hereinbelow.

The Organic Solvent

The present invention may be practiced in combination with a wide variety of organic solvents. The criteria for preferred solvents include the ability to solvate resin, pigments and the like, compatibility with the coupler and acid, and secondary factors such as cost, availability, toxicity and the like. Generally, the organic solvents will include aromatic hydrocarbons such as xylenes, toluene and the like, including halogenated forms thereof. A variety of commercial products are available under the general designation of aromatic naphthas, and these mixtures comprise blends of medium boiling aromatic solvents typically including alkyl benzenes. One particularly preferred group of aromatic solvents comprise the aromatic naphthas sold under the designation Cyclosol by the Shell Chemical Corporation. Cyclosol 53 is one specific member of that family found to have particular utility in the present invention. Equivalent materials such as the aromatic solvent mixture sold by the Gage Products Company under the designation GP 100 may be similarly employed. Other equivalent materials are known and available to those of skill in the art.

The organic solvent portion of the composition of the present invention may also include aliphatic hydrocarbons therein, including halogenated forms thereof. Typically, these will also constitute medium boiling materials of the approximately C5–C10 range. The organic solvent may also include somewhat more polar materials therein such as esters and ketones, with the aliphatic esters and ketones being particularly preferred. Generally, esters of C1–C8 alcohols and C1–C8 acids are preferred.

One preferred ester material comprises N-butyl acetate. This ester is readily available at relatively low cost and solvates a variety of paint deposits, particularly when acting in combination with the other components of this composition. Other esters, as well as ketones, cyclohexanone such as methyl isobutyl ketone, methyl ethyl ketone and the like also have significant utility in the present invention. One commercial product having utility as a solvent in the present invention is an ester based paint solvent sold by the DuPont Corporation under the designation "Dibasic Ester".

It is generally preferred that the organic component comprise a blend of solvents, typically with one component being aromatic naphtha or another such low polarity solvent, and the second being a higher polarity solvent such as an ester or ketone. In one specific group of compositions of the present invention, the organic solvent comprises a mixture of light aromatic naphtha and N-butyl acetate. The two components may be blended together in a range of compositions running from 5 to 1 to 1 to 5. In one preferred group of compositions, the aromatic solvent will be present in an amount equal to, or greater than, the amount of ester. In a specific group of compositions, the organic solvent comprises approximately three parts of light aromatic naphtha and one part of the ester.

The organic portion of the composition is generally present in an amount of 20–90% by weight of the composition. More particularly, the organic portion will comprise 40–90% of the composition. In one group of compositions the organic portion comprises 60–80% thereof.

The Coupler

The composition includes a component which serves to couple the acid portion of the cleaner to the organic solvent. As such it typically comprises an organic molecule having a fairly high polarity. Among some of the preferred couplers are materials such as alcohols, glycols, glycol ethers and combinations thereof. Among the alcohols, aliphatic alcohols are particularly preferred, especially the C1–C5 alcohols. Isopropyl alcohol is one specific coupler having utility in the present invention. It is relatively low in cost and readily available. Other alcohols such as N-propyl alcohol, butyl alcohol, amyl alcohol and methyl alcohol as well as phenols are also advantageously employed. Glycols, particularly ethylene glycol and propylene glycol, as well as ethers based thereupon are also effective as coupling agents.

In those instances where relatively large proportions of the acid are present in the composition and/or when relatively low amounts of coupler are present, the composition may assume two phases. Such compositions are still within the scope of the present invention, and may still be effectively employed as line cleaning compositions.

The coupler typically comprises between 5 and 30% by weight of the composition. In one particular group of compositions, the coupler comprises between 10 and 15% by weight of the composition.

The Hydroxy Carboxylic Acid

In accord with the present invention, it has been found that hydroxy carboxylic acids are an advantageous ingredient in paint line strippers. One preferred group of acids comprises alphahydroxy acids, of which glycolic acid and lactic acid are particularly preferred, with glycolic acid being most preferred.

Glycolic acid is relatively nontoxic and has no objectionable odor. Glycolic acid is also referred to in the industry as: hydroxy acetic acid, alpha hydroxy acetic acid, or 1-hydroxy ethanoic acid. It is a crystalline solid having a relatively low melting point, and on a commercial basis, is typically supplied as a 70% solution in water.

In the practice of the present invention, the acid is present in an amount of approximately 0.5–30% by weight of the composition. Most typically, the acid is glycolic acid and comprises 2–25% by weight of the composition. Glycolic acid is usually supplied, as 70% solution in water, and it has been found that the present invention may be practiced utilizing either anhydrous glycolic acid, or the aforementioned solution, without adverse effect. Other acids are also often supplied as aqueous concentrates. Therefore, it should be noted that the compositions of the present invention may optionally include some amount of water, attributable to the acid solution. Such amount of water is optional, and is typically present in an amount up to 30% of the weight of the acid.

Ancillary Ingredients

While the foregoing ingredients comprise the basic cleaning composition of the present invention, further additions thereto may be made in order to optimize the composition for particular applications without departing from the present invention. For example, in some instances it has been found that the addition of small amounts of oxidizing agents further enhance the effectiveness of the composition with regard to automotive paint formulations. Such oxidizing materials may include peroxides, with hydrogen peroxide being one particularly preferred material because of its relatively low cost and compatibility with a variety of solvents and couplers. Typically the hydrogen peroxide is employed as an aqueous solution, and it has been found that amounts of up to 5%, by weight, of a 35% commercial solution of hydrogen peroxide are of benefit in particular instances. In one specific group of compositions, the hydrogen peroxide is present in an amount of approximately 1% of a 35% solution.

In other instances, the compositions of the present invention may include a pH control agent therein for maintaining the pH of the composition in the approximate range of 3–11. It is desirable to maintain the pH in this range, since materials having a pH outside of that range are considered corrosive and require neutralization or special treatment before disposal. Most preferably, the pH is maintained in the range of 3–5. The pH control agent may comprise a buffering mixture as is well known in the art. In some particular instances, pH control may be achieved by addition of relatively small amounts of inorganic alkalis or ammonia or organic amines.

Another ingredient which has been found to be of benefit in some particular formulations is cyclohexane dimethanol (CHDM). This is a commonly employed industrial organic chemical, typically supplied on a commercial basis, as a mixture of 30% of the cis isomer and 70% of the trans isomer. CHDM is both water and organic soluble, and is also a good solvent for a variety of organic materials; and in the compositions of the present invention, it functions as an auxiliary booster and as an auxiliary organic solvent. Typically when CHDM is added to the compositions it is present in an amount of up to 10%, and in a preferred group of compositions is present at a concentration of approximately 5%.

The compositions of the present invention are suitable for cleaning various components of a paint delivery system. Typically, the compositions are pumped through the lines of the paint system to remove residues therefrom. In such instances, it is generally preferred that the viscosity of the composition be relatively low, and as prepared, the composition has a viscosity comparable to that of water. However, in some instances, the material will be employed to clean vats, tanks, paint booths and the like, and in such instance it may be advantageous to include thickening agents therein so as to increase the composition's viscosity. Such thickening agents are well known in the art, and the composition of the present invention is compatible with a wide variety of thickening agents. Among some of such agents are cellulose derivatives such as hydroxy alkyl celluloses, gelatin, synthetic polymers and the like. The compositions of the present invention may include surfactants therein to enhance their ability to wet the surfaces being cleaned. A number of surfactant compositions are known and readily available to those of skill in the art, and the composition of the present invention is compatible with a wide variety of ionic and nonionic surfactants. The compositions of the present invention may also include corrosion inhibitors for metals such as brass, aluminum and steel. Among some of the commonly employed corrosion inhibitors are derivatives of triazoles, molybdates, imidazolines, and fatty amines; and these, as well as other corrosion inhibitors known in the art, may be incorporated in the present formulations.

In some instances, particularly when the compositions of the present invention will be used in a system open to the atmosphere, it may be desirable to include a vapor suppressant therein. As is well know in the art, paraffin may be used as a vapor suppressant for organic liquids, as may be other waxes both natural and synthetic. The compositions of the present invention may also include coloring agents, fragrances and the like.

While it is a particular advantage of the compositions of the present invention that they are capable of cleaning a variety of paint residues without the need for incorporation of any abrasive materials therein, there may be particular applications wherein abrasivity is required for a specific cleaning application; and in such instances, abrasive materials such as natural minerals, glass particles, ceramic particles or polymeric particles may be added to the compositions of the present invention without departure from the spirit or scope thereof.

EXAMPLES

The present invention will be illustrated with reference to some specific examples, it being understood that these examples are illustrative and not limiting upon the present invention.

In a first experimental series, a number of formulations, including compositions of the present invention, as well as comparative compositions, were prepared and evaluated. The composition of these various formulations of this first experimental series is set forth in Table 1, on the basis of weight percent. As noted previously, the ingredient identified as Cyclosol 53 comprises a light aromatic naphtha sold by the Shell Chemical Corporation. The material identified as Cyclosol 63 is also sold by the Shell Chemical Corporation and comprises a heavier naphtha. The material identified as Oxsol 10 comprises a chlorotoluene sold by the Oxidental Chemical Corporation. The material identified as Igepal OD 410 comprises an ethoxylated phenol sold by the Rhone Poulenc Corporation of Cranbury, N.J. The material identified as DPM comprises dipropylene glycol monomethyl ether sold by the Arco chemical corporation. The cyclohexane dimethanol employed in this formulation comprises a 90% technical grade product, and the glycolic acid comprises a 70% aqueous solution, while the hydrogen peroxide comprises a 35% aqueous solution and the ammonia a 28% aqueous solution. In these tables, all of the listed amounts correspond to the actual amounts of the CHDM or solutions employed, and the actual amount of active ingredient will be correspondingly lower.

In Table 1, it will be noted that Formulation A includes no specific compositional data; this is because this formulation is a comparative example which comprises a standard commercial line cleaner product sold by the Parker Amchem Division of the Henkel Corporation under the designation P3 Paint Line Cleaner 118-23517. This product is sold for the express purpose of cleaning paint lines. Another control formulation is Formulation B which comprises a purge solvent blend sold by the Gage Products Company under the designation CN31295. This solvent mixture is employed to purge paint equipment lines between color changes, and is highly effective in flushing fresh paint from the lines, but is not intended for use in removing built up paint residues. This product is included for comparative purposes to show how difficult it is to clean residues.

The formulations of Table 1 were tested against a variety of paint residues derived from a variety of paints representative of those which are dispensed through the lines of paint delivery systems in the course of fabrication of motor vehicles. Paint soils were prepared from the various paints listed in Table 2 by concentrating the pigment portion of the paint by centrifuging the paint for one hour at 2600 rpm. The solvent/resin layer was decanted from the precipitated paint, and the concentrated pigment portion was diluted with solvent until rendered fluid. Solvent borne paints were diluted with N-butyl acetate, and water borne paints were diluted with water. This paint soil suspension was uniformly coated into four dram vials and dried for one hour at 180° F. to produce a paint soil sample. Five ml of each of the compositions under investigation was introduced into a soiled vial which was stoppered and shaken for one hour at 400 rpm on a rotary shaker. The vials were then emptied, rinsed with isopropyl alcohol and dried for one hour at 180° F. Soil removal was determined by loss of weight of the vial, with weighings being made to an accuracy of 0.1 mg. It has been found that this test protocol correlates very well with visual data obtained by photographic inspection of paint line interiors in the field.

The data in Table 2 lists the amount of soil removal, on a percentage basis, for each of the compositions A–N, and for each of the specified paint line soils. The data is summarized at the bottom of the table to show minimum and maximum soil removal for each formulation as well as the average soil removal, and the standard deviation in the removal data for the various compositions. It will be noted from the table that all of the formulations are capable of removing 90% or more of certain of the residues, but many of the formulations are of low effectiveness against certain of the residues. In this table, a low standard deviation is indicative of a formulation which is effective against a large number of paint residues.

As will be noted from the data, the commercially available product designated as Formula A produces an average soil removal of 56%, and varies to a large degree in its effectiveness against a variety of paint soils.

Formulation C is one typical formulation made in accord with the present invention, and it will be noted that it is highly effective against a large number of paint compositions. Formulation D is similar to Formulation C except that CHDM has been added thereto, and it will be noted that the overall effectiveness is further improved. The addition of hydrogen peroxide, as represented by Formulation E further increases the effectiveness of the material. Formulations F and G represent a doubling and tripling of the glycolic acid concentration, and it will be noted that some further improvement, as compared to Formulation C, is obtained. The addition of water to Formulation F did not adversely decrease cleaning performance.

Formulations I and J represent buffered formulations having a pH in the region of 3–4. Some loss of effectiveness is noted, but these formulations are still superior in performance to the commercially employed product of Formulation A. Formulations K and L eliminate the aromatic naphtha and substitute chlorotoluene and benzyl alcohol therefore. These particular solvents are not listed as hazardous air pollutions or SARA Title III Listed. Formulations M and N represent high flash point versions of the composition of the present invention.

In a second experimental series as represented by data in Tables 3 and 4, the effect of substituting other acids for the glycolic acid of the present invention was evaluated. Table 3 lists a number of formulations which are substantially similar to Formulation F of Table 1, except that lactic acid, acetic acid, formic acid and methane sulfonic acid were substituted for the glycolic acid.

The formulations of Table 3 were evaluated against paint line soils in accord with the procedure previously described, and the results of this evaluation are summarized in Table 4. It will be noted from this table that the formulations including the acetic, formic and methane sulfonic acids are notably inferior to the formulation of the present invention. The lactic acid containing formulation was nearly as effective as the glycolic acid containing composition. This data is indicative of the fact that hydroxy carboxylic acids, and in particular alphahydroxy carboxylic acids are effective in the compositions of the present invention.

Further variations of the foregoing can be implemented in accord with the present invention. For example, propylene or ethylene glycol may be directly substituted for the isopropyl alcohol coupler. Likewise, glycol ethers, such as ethylene glycol monomethyl ether may be similarly employed. Other esters such as amyl acetate may be employed as a portion of the organic solvent. Likewise, cyclohexanone, methyl ethyl ketone or methyl isobutyl ketone may be employed. Other toluenes or xylene mixtures may be substituted for the cyclosol, as may be aliphatic petroleum ethers. Still other embodiments can be prepared or detailed hereinabove.

In view of the discussion, description and examples present herein, other modifications and variations of the present invention will be readily apparent to one of skill in the art. Therefore, it is to be understood that the foregoing examples are merely illustrative of particular embodiments of the invention and are not meant to be limitations upon the practice thereof. It is the following claims, including all equivalents, which define the scope of the invention.

TABLE 1

| Ingredients | A | B | C | D | E | F | G | H | I | J | K | L | M | N |
|---|---|---|---|---|---|---|---|---|---|---|---|---|---|---|
| Cyclosol 53 | | | 61.34 | 58.41 | 59.55 | 57.40 | 53.95 | 54.08 | 56.49 | 56.61 | | | | |
| Chlorotoluene (Oxsol 10) | | | | | | | | | | | 57.52 | | | |
| Benzyl Alcohol | | | | | | | | | | | | 57.00 | 57.00 | |
| Igepal OD 410 | | | | | | | | | | | | | | 57.00 |
| N-Butyl Acetate | | | 19.05 | 18.14 | 18.49 | 17.82 | 16.75 | 18.0 | 17.54 | 17.58 | 17.83 | 18.00 | | |
| Dibasic Esters | | | | | | | | | | | | | 18.00 | 18.00 |
| Isopropyl alcohol | | | 12.76 | 12.15 | 12.40 | 11.96 | 11.23 | 12.02 | 11.77 | 11.78 | 11.92 | 12.00 | | |

TABLE 1-continued

| Ingredients | A | B | C | D | E | F | G | H | I | J | K | L | M | N |
|---|---|---|---|---|---|---|---|---|---|---|---|---|---|---|
| Cyclohexane dimethanol (90%) | | | | 4.76 | | | | | | | | | | |
| DPM | | | | | | | | | | | | | | 12.00 | 6.00 |
| N-Methyl 2 pyrrolidone | | | | | | | | | | | | | | 6.00 |
| Hydroxy Acetic acid (70%) | | | 6.85 | 6.54 | 6.65 | 12.82 | 18.07 | 12.86 | 12.61 | 12.65 | 12.73 | 13.00 | 13.00 | 13.00 |
| Hydrogen Peroxide (35%) | | | | | 2.91 | | | | | | | | | |
| 28% ammonia | | | | | | | | | 1.59 | | | | | |
| Monoethanolamine | | | | | | | | | | 1.38 | | | | |
| Water | | | | | | | | 3.01 | | | | | | |
| Total | | 100 | 100.00 | 100.00 | 100.00 | 100.00 | 100.00 | 100.00 | 100.00 | 100.00 | 100.00 | 100.00 | 100.00 | 100.00 |

TABLE 2

| Paint Line Soils | A | B | C | D | E | F | G | H | I | J | K | L | M | N |
|---|---|---|---|---|---|---|---|---|---|---|---|---|---|---|
| M6401 Titanium Basecoat (Dupont solventborne, Ford Ohio truck) | 54 | 52 | 97 | 98 | 99 | 99 | 99 | 99 | 57 | 78 | 100 | 97 | 83 | 63 |
| JSO Green Basecoat (PPG waterborne, Nissan Smyrna plant) | 4 | 3 | 99 | 86 | 98 | 100 | 97 | 93 | 92 | 78 | 92 | 81 | 84 | 31 |
| ALO RED Basecoat (PPG waterborne, Nissan Smyrna plant) | 70 | 35 | 83 | 43 | 89 | 89 | 100 | 84 | 66 | 77 | 78 | 78 | 62 | 0 |
| Horizontal Clear Topcoat (PPG solventborne, Nissan Smyrna plant) | 99 | 100 | 100 | 70 | 100 | 100 | 99 | 93 | 82 | 99 | 87 | 83 | 84 | 19 |
| Vertical Clear Topcoat (PPG solventborne, Nissan Smyrna plant) | 23 | 19 | 100 | 87 | 100 | 100 | 99 | 75 | 57 | 86 | 69 | 98 | 94 | 96 |
| M6210 Colonial White (Dupont solventborne, Ford Ohio truck) | 85 | 69 | 96 | 93 | 97 | 98 | 94 | 98 | 54 | 5 | 97 | 96 | 98 | 92 |
| M6623 Portofino Blue (Dupont solventborne, Ford Norfolk plant) | 41 | 70 | 61 | 92 | 79 | 69 | 77 | 71 | 62 | 60 | 95 | 42 | 90 | 59 |
| E97YE904 Yellow (BASF solventborne, GM Flint) | 61 | 37 | 16 | 79 | 89 | 89 | 92 | 98 | 48 | 21 | 97 | 78 | 68 | 58 |
| E97YE418 Orange (BASF solventborne, GM Flint) | 33 | 26 | 100 | 96 | 100 | 100 | 100 | 99 | 95 | 93 | 98 | 98 | 97 | 23 |
| KKO Black Basecoat (BASF solventborne, Nissan Smyrna plant) | 87 | 71 | 99 | 92 | 100 | 100 | 100 | 100 | 78 | 60 | 96 | 99 | 98 | 65 |
| Minimum soil removal % | 4 | 3 | 16 | 43 | 79 | 69 | 77 | 71 | 48 | 5 | 69 | 42 | 62 | 0 |
| Maximum soil removal % | 99 | 100 | 100 | 98 | 100 | 100 | 100 | 100 | 95 | 99 | 100 | 99 | 98 | 96 |
| Average soil removal % | 56 | 48 | 85 | 84 | 95 | 94 | 96 | 91 | 69 | 66 | 91 | 85 | 86 | 51 |
| Std deviation % | 31 | 29 | 27 | 16 | 7 | 10 | 7 | 11 | 17 | 31 | 10 | 17 | 12 | 31 |

TABLE 3

| Ingredients | F | O | P | Q | R |
|---|---|---|---|---|---|
| Cyc 53 | 57.40 | 57.40 | 57.40 | 57.40 | 57.40 |
| N-Butyl Acetate | 17.82 | 17.82 | 17.82 | 17.82 | 17.82 |
| Isopropylalcohol | 11.96 | 11.78 | 11.78 | 11.78 | 11.78 |
| Hydroxy Acetic acid (70%) | 12.82 | | | | |
| Lactic Acid (88%) | | 13.00 | | | |
| Acetic Acid (Glacial) | | | 13.00 | | |
| Formic Acid (90%) | | | | 13.00 | |
| Methane sulfonic Acid (100%) | | | | | 9.38 |
| Water | | | | | 3.62 |
| Total | 100.00 | 100.00 | 100.00 | 100.00 | 100.00 |

TABLE 4

FORMULATION

| Paint Line Soils | F | O | P | Q | R |
|---|---|---|---|---|---|
| M6401 Titanium Basecoat (Dupont solventborne, Ford Ohio truck) | 99 | 98 | 46 | 92 | 87 |
| JSO Green Basecoat (PPG waterborne, Nissan Smyrna plant) | 100 | 95 | 3 | 88 | 80 |
| ALO RED Basecoat (PPG waterborne, Nissan Smyrna plant) | 89 | 74 | 5 | 75 | 84 |
| Horizontal Clear Topcoat (PPG solventborne, Nissan Smyrna plant) | 100 | 89 | 78 | 91 | 72 |
| Vertical Clear Topcoat (PPG solventborne, Nissan Smyrna plant) | 100 | 74 | 95 | 16 | 94 |
| M6210 Colonial White (Dupont solventborne, Ford Ohio truck) | 98 | 97 | 95 | 97 | 93 |
| M6623 Portofino Blue (Dupont solventborne, Ford Norfolk plant) | 69 | 95 | 48 | 53 | 25 |
| E97YE904 Yellow (BASF solventborne, GM Flint) | 89 | 79 | 60 | 87 | 87 |
| E97YE418 Orange (BASF solventborne, GM Flint) | 100 | 98 | 98 | 100 | 99 |
| KKO Black Basecoat (BASF solventborne, Nissan Smyrna plant) | 100 | 96 | 22 | 99 | 98 |
| Minimum soil removal % | 69 | 74 | 3 | 16 | 25 |
| Maximum soil removal % | 100 | 98 | 98 | 100 | 99 |
| Average soil removal % | 94 | 90 | 55 | 80 | 82 |
| Std deviation % | 10 | 10 | 37 | 26 | 22 |

I claim:

1. A paint line cleaner consisting essentially of, by weight:
   20–90% of an organic solvent selected from the group consisting of: aromatic hydrocarbons, aliphatic hydrocarbons, aliphatic esters, and combinations thereof;
   5–30% of a coupler selected from the group consisting of: alcohols, glycols, glycol ethers, and combinations thereof;
   0.5–30% of a hydroxy carboxylic acid; and
   optionally, water in an amount equal to up to 30% by weight of the amount of said hydroxy carboxylic acid which is present.

2. A paint line cleaner as in claim 1, wherein said hydroxy carboxylic acid is an alpha hydroxy carboxylic acid.

3. A paint line cleaner as in claim 1, wherein said hydroxy carboxylic acid is selected from the group consisting of glycolic acid, lactic acid, and combinations thereof.

4. A paint line cleaner as in claim 1, further including an ancillary ingredient selected from the group consisting of: thickening agents, oxidizing agents, surfactants, vapor suppressants, corrosion inhibitors, colorants, buffers, and combinations thereof.

5. A paint line cleaner as in claim 1, including 40–90% of said organic solvent.

6. A paint line cleaner as in claim 1, including 60–80% of said organic solvent.

7. A composition as in claim 1, wherein said organic solvent comprises a mixture of light aromatic naphtha and N-butyl acetate.

8. A paint line cleaner as in claim 1, including 10–15% of said coupler.

9. A paint line cleaner as in claim 1, wherein said coupler comprises isopropyl alcohol.

10. A paint line cleaner as in claim 1, including 2–25% of glycolic acid.

11. A paint line cleaner consisting essentially of, by weight:
    20–90% of an organic solvent selected from the group consisting of: aromatic naphtha, an aliphatic ester of a C1–C8 alcohol and a C1–C8 acid, and combinations thereof;
    5–30% of a coupler which comprises at least one member selected from the group consisting of C1–C5 alcohols;
    0.5–30% of an alpha hydroxy carboxylic acid; and
    optionally, water in an amount up to 30% of the amount of the alpha hydroxy carboxylic acid present in said line cleaner.

12. A paint line cleaner as in claim 11, further including an ancillary ingredient therein selected from the group consisting of: thickeners, oxidizers, surfactants, vapor suppressants, corrosion inhibitors, colorants, buffers, and combinations thereof.

13. A paint line cleaner as in claim 11, including 40–90% of said organic solvent.

14. A paint line cleaner as in claim 11, including 60–80% of said organic solvent.

15. A paint line cleaner as in claim 11, including 10–15% of said coupler.

16. A paint line cleaner as in claim 11, including 2–25% of said alpha hydroxy carboxylic acid.

17. A paint line cleaner as in claim 11, including, as an ancillary ingredient, a pH control agent in an amount sufficient to maintain said composition at a pH of no less than 3.

18. A paint line cleaner consisting essentially of, by weight:
    60–80% of an organic solvent comprising a mixture of light aromatic naphtha and N-butyl acetate;
    10–15% of isopropyl alcohol;
    2–25% of a 70% aqueous solution of glycolic acid; and
    optionally up to 5% of a member selected from the group consisting of cyclohexane dimethanol, hydrogen peroxide, water, and combinations thereof.

* * * * *